Patented Apr. 12, 1949

2,467,228

UNITED STATES PATENT OFFICE 2,467,228

PROCESS FOR OBTAINING DECORATIVE CRACKLE FINISHES

Lee Pritzker, Baltimore, Md.

No Drawing. Application December 7, 1945, Serial No. 633,521

4 Claims. (Cl. 117—41)

My invention relates to new and useful improvements in methods or processes for obtaining unique decorative finishes as surface coatings and more particularly to the method of applying same to produce decorative finishes, the principal object of the invention being to provide a decorative finish to wood, metal, plastic or the like with organic coatings, such as paints, enamels, varnishes, lacquers, stencil inks, plastics or the like, utilizing certain inherent repellent qualities in the organic coatings.

It is well known in the art of decorative and protective finishes that various methods exist resulting in novel effects, referred to in the art as wrinkle finishes, spatter effects, hammered effects, etc., but my invention in no way depends on any of the physical or chemical properties existing in the aforesaid methods and is a departure from and an advance over the conventional or known methods practiced in the art.

An object of the invention resides in the application to a surface of an organic coating which is so chemically and physically treated as to possess certain unique repellent qualities, whereby when a second coating is applied thereto, novel decorative effects may be produced.

I have found that organic coatings so treated as to provide unique repellent properties may be applied to articles of manufacture and when processed or treated properly will result in a film or coating that will cause to repel from its surface other coatings which may be applied thereto. By scientifically preparing these coatings, different degrees of repellency may be obtained, resulting in a predetermined pattern or design when subsequent coatings are applied thereover.

It is, therefore, the principal object of the invention to utilize the phenomena of repellency in one coating applied to an article of manufacture to produce varied effects or predetermined designs or effects, upon the application of a second coating to the first coating containing the repellent properties.

To illustrate my process, I shall describe certain steps which may be followed to provide certain effects. Having available a particular article of manufacture, regardless of its nature, whether made of wood, metal, plastic or other material, there is applied thereto, in any manner whatsoever, that is either by brush, spray, silk screen or the like, a coating of paint, enamel, varnish, lacquer, stencil ink, plastic or other material so processed as to possess the property of repelling other organic coatings which may be applied thereto. This coating is allowed to dry by any desired means, that is by air, baking or through any natural or artificial means. To the dried coating I apply, by any means whatsoever, that is by brush, spray, dipping, wiping, screening, rubbing or otherwise, a second organic coating of predetermined wetting quality. If there is no predetermined design desired on the article of manufacture, the first coat possessing repellent properties is applied in a smooth and uniform manner, and when allowed to dry by any desired means the second coat is applied over it. This will result in a particular effect, which is more or less mottled. This mottled effect is created by the repellent property contained in the first coating. By scientifically preparing the coatings, different degrees of repellency may be obtained, resulting in various patterns or designs. In other words, the design or effect may be controlled by the processing of the first coating with respect to its repellent properties. In other words, substantially every particle or particles of the second or subsequent coating will be repelled away from the surface of the first coating, depending upon the surface tension or repellency existing on the surface of the dry film of the first coating. The second or subsequent coatings applied over the repellent film or coating will not flow or form a continuous film as ordinary coatings will do, but will flow away from the surface, exposing certain sections, areas or parts of the first repellent coat. The amount or degree of repellency depends solely on the repellent controlled properties of the first dried coating and/or the wetting ability of the second coating. By this method of control, innumeral novel effects, designs or patterns may be obtained on the surface of the article of manufacture.

If a predetermined specific design or pattern or picture or configuration is desired, then the first coat can still be applied in a smooth uniform manner and properly dried. I have found that if any portion of the dried surface of the first repellent coat is disturbed by chemical, physical, or mechanical means, the repellent properties of the dried coating are destroyed or impaired. Therefore, by disturbing the surface of the first coating in a predetermined design or pattern, etc., these areas then will not repel the second coat which is applied over its surface but will adhere as a continuous film resulting in the same predetermined design or configuration, or pattern as the disturbed area surrounded by the repellent mottled effects of the undisturbed parts. The surface can be disturbed by such means as special molded rollers, special designed stamps, or any mechanical devices for touching the surface to form predetermined designs or patterns. In fact, any impression, predetermined or otherwise, which may be made on the first coating by any means, even when not revealed at the time will be disclosed upon the application of the second coating. This is due to the fact that the repellancy of the first coat is actually disturbed or impaired by such impression. Hence, upon application of the second coat, the surface so disturbed or impaired will not repel said second coat, while the undisturbed or unimpaired portions will repel same.

A third method, to produce a slightly different effect, involves the formation on the surface of an article of manufacture of certain configurations or designs with a surface coating such as paint, enamel, varnish, lacquer, stencil ink, plastic or the like possessing certain repellent qualities. This coating applied in this particular design on the surface of an article of manufacture is allowed to dry by natural or artificial means and after drying, the second coating, as aforesaid, is applied thereto. The repellent properties of the first coating applied as a particular design or configuration appearing on the surface of the article of manufacture will cause the second coating to establish itself over the area surrounding the particular design or configuration, thus leaving the latter free of the second coating and standing out substantially in bas relief.

Obviously I do not limit myself to any means of application of the first repellent coat or film by any particular means, since it may, as aforesaid, be applied by any approved method. Nor do I limit myself to any color, shade, hue or combination thereof or any type of coating, since all types of organic coatings may be prepared or treated so as to possess repellent properties, as above described. It is a feature of the invention, as described above, to control the repellent properties of the first coating and to control the second coating in its wetting ability when applied to the first coating. Through this medium, as aforesaid, the various novel effects, designs and patterns may be obtained.

In order to prepare organic coatings to possess the unique properties of drying to a film that will cause second or subsequent coats to be repelled from it as outlined above, advantage is taken of the fact that certain solutions or compounds can be made that have the peculiar property of causing this phenomena to result when incorporated into many organic coatings, plastics and the like. These solutions or compounds can be prepared to give variable repellent properties dependent on the method of processing and the physical and chemical reactions during manufacture. Oils suitable for the purpose of manufacture of these solutions or compounds include the drying and semi-drying fatty oils such as tung, linseed, oiticica, soya bean, fish, cottonseed, perilla, etc. Non-drying oil such as cottonseed, corn, etc., can be also included or substituted, at least in part. Metallic salts include the oxides of lead, zinc, calcium, magnesium, manganese, and barium, as well as the hydroxides and carbonates. Examples of manufacture of solutions that will cause repellent properties when added to organic coatings are:

*Solution A*

| | Pounds |
|---|---|
| Linseed oil | 800 |
| Calcium hydroxide | 40–120 |
| High flash naphtha | 840 |

The fatty oil, (i. e. linseed oil) is heated in the conventional manner to 500 degrees F. and the calcium hydroxide slowly sprinkled in the batch. The oil is carefully stirred and the metallic oxide slowly worked in. When the reaction is complete and all the calcium hydroxide is reacted with the fatty oil, the stirring is stopped and the batch is held at 500 to 510 degrees F. until a drop of oil on glass results in a hard pill. This reaction will require a holding time of approximately 45 min. to 95 min. The batch is allowed to cool to 410 to 405 degrees F., and is then thinned with the solvent (naphtha). The solution is then clarified or strained by any conventional means and will be stable for long periods of time.

*Solution B*

| | Pounds |
|---|---|
| Linseed oil | 800 |
| Zinc oxide | 40–80 |
| Butyl Cellosolve | 700 |

Procedure the same as for solution A.

*Solution C*

| | Pounds |
|---|---|
| Oiticica oil | 800 |
| Magnesium carbonate | 60 to 80 |
| Xylol | 800 |

Innumerable variations of these metallic soap solutions or compounds are possible and each will result in definite repellent properties when added to organic coating.

To further illustrate the method of producing novel decorative effects the following are examples:

*First coat or repellent base coat—Example 1*

| | | |
|---|---|---|
| Lampblack | lbs | 15 |
| Iron red | lbs | 100 |
| Varnish | gals | 80 |
| Thinner and drier | gals | 5 |
| Solution A | gals | 5–10 |

*Second coat—Example 1*

| | | |
|---|---|---|
| Lampblack | lbs | 5 |
| Iron red | lbs | 25 |
| Iron yellow | lbs | 25 |
| Varnish | gals | 85 |
| Thinner and drier | gals | 10 |
| Butyl Cellosolve | gal | ½–1 |

These coatings as represented by Example 1 are manufactured in the usual manner as recognized by good procedure in the industry and will be recognized by those versed in the art of the manufacture of organic coatings to represent basically a brown coating in this particular case. To obtain a novel finish with these two coatings the article of manufacture is coated first with base coat, Example 1 and allowed to dry. When properly dried second coat, Example 1 is applied and instead of a continuous film or coat, it will result in a separation on the surface into areas or islands exposing the under surface in portions. If properly formulated the article of manufacture will simulate artificial leather of a pleasing effect. If a still more novel effect is desired, prior to the application of the second coat the dried area of coating one is disturbed as aforesaid. By rolling with a roller having certain geometric configurations imposed into it or otherwise and then applying the second coat, an effect similar to the design of alligator skin will result. By simply increasing the wetting or penetrating properties of the second coat, as for instance by the addition of more surface tension reducing agents or by hydrophyllic materials such as butanol, alcohol, or butyl Cellosolve or the like, less repellancy will result and an entirely different pattern will be formed. Likewise, increasing the surface tension of the first coat by increasing the quantity of repellent solution A, and decreasing the tension reducing agents in the second coat as butyl Cellosolve, larger areas can be repelled and again different designs or effects will result.

Another example of novel decorative effect is the following:

*First coat—Example 2*

| | | |
|---|---|---|
| Ultra-Marine Blue | lbs | 25 |
| Titanium dioxide | lbs | 100 |
| Titanox RC-HT | lbs | 100 |
| Lampblack | lb | 1 |
| Varnish | gals | 65 |
| Thinner and driers | gals | 5 |
| Solution B | gals | 5–10 |

*Second coat—Example 2*

| | | |
|---|---|---|
| Aluminum pigment paste | lbs | 100 |
| Varnish | gals | 50 |
| Butanol | gal | 1 |
| Xylol | gal | 1 |

As described above these coatings are made in the orthodox manner and will be recognized by the industry as representing a first coat of a blue gray coating and a second coat of aluminum bronze finish.

The first coat is applied to the article of manufacture and when properly dried the second coat is applied. The effect obtained will resemble hammered metals. By increasing the amount of solution B in the first coat, more repellancy will result and larger areas will be exposed, when the second coat is applied, giving a coarser texture or designs. Likewise, increasing the xylol or butanol will decrease the texture. If more than two colors or hues or shades are desired then the first coat having repellent properties is applied and a second coat of any organic coating can be also treated with repellent solutions and applied over it. This second coating will not form a continuous film but will be repelled away in sections from the surface of the first coat. However, the areas of the second coat when dried will still possess the unique property of repellancy, so that if a third coat is applied it will be repelled from both coats 1 and 2 giving a multiple colored effect to the article of manufacture.

Still another illustration to obtain novel effects is as follows:

*Example 3*

| | | |
|---|---|---|
| Medium chrome yellow | lbs | 640 |
| Varnish | gals | 70 |
| Solution C | gals | 10 |

This formula will be recognized by the industry as a paste suitable for silk screen work. To obtain a novel effect the design or figure or pattern desired is cut into a silk screen and by the common process of silk screening the coating of Example 3 applied directly to the surface of the article desired to be decorated. When properly dried a second coat of an organic coating of any formulation can be applied and it will be repelled away from the first design but covering all the areas not taken up by the said design of the first application allowing the pattern or design to stand out in bas relief.

By making up several colored pastes similar to the above and applying different sections with different colors, multiple color effects may be obtained.

Since the number of novel effects or combinations of effects and designs are unlimited I do not limit myself to any particular formulae or combination of formulae since I have found that it is possible to make thousands of organic coatings in the manner as outlined, nor do I limit myself to the particular repellent solutions above mentioned since unlimited variations are possible. In my disclosure of certain formulae I do not differentiate between the different types of film forming materials as known to the coating industry, but merely mention them as varnishes which I consider sufficient to illustrate my invention. The term varnish throughout this specification is not indicative of any specific term, but is meant to be the vehicle, binder or film forming part of an organic coating. Nor do I differentiate the methods of incorporating the repellent solution in the varnish since in most cases it can be added directly in the process of paint manufacture and also to the varnish at the time it is manufactured.

It will be understood that I desire to comprehend within my invention such modifications as come within the scope of my claims.

Having thus described my invention, what I claim is:

1. A process of obtaining decorative finishes consisting in applying to a surface of an article, an organic coating containing a repellent substance, said coating being capable of forming a continuous coating on the surface but said coating when dry being capable of repelling other organic coatings, allowing same to dry and applying thereto a second organic coating free from said repellent substance whereby said second coating is repelled by the first coat to produce a discontinuous second coat on said first coat, in which process the first coat is a varnish containing an amount of soap of fatty oil acids with a metal selected from the group of calcium, zinc and magnesium, sufficient to give repellent properties to a dry coating of said varnish; and the second coat is of a varnish distinguishingly colored from said first coat and is free from said soap.

2. A process of obtaining decorative finishes consisting in applying to a surface of an article, an organic coating containing a repellent substance, said coating being capable of forming a continuous coating on the surface but said coating when dry being capable of repelling other organic coatings, allowing same to dry and applying thereto a second organic coating free from said repellent substance whereby said second coating is repelled by the first coat to produce a discontinuous second coat on said first coat, in which process the first coat consists of varnish 80 gallons, thinner and drier 5 gallons, pigment 115 pounds, and from 5 to 10 gallons of a batch produced by heating 800 pounds linseed oil to 500° F. with from 40 to 120 pounds of calcium hydroxide and thinned with 840 pounds of high flash naphtha; and the second coat consists of varnish 85 gallons, thinner and drier 10 gallons, butyl Cellosolve from ½ to 1 gallon, and pigment 55 pounds.

3. A process of obtaining decorative finishes consisting in applying to a surface of an article, an organic coating containing a repellent substance, said coating being capable of forming a continuous coating on the surface but said coating when dry being capable of repelling other organic coatings, allowing same to dry and applying thereto a second organic coating free from said repellent substance whereby said second coating is repelled by the first coat to produce a discontinuous second coat on said first coat, in which process the first coat consists of varnish 65 gallons, thinner and drier 5 gallons, pigment 226 pounds, and from 5 to 10 gallons of a batch produced by heating 800 pounds linseed oil to 500° F. with from 40 to 80 pounds zinc oxide and thinned with 700 pounds of butyl Cellosolve; and the second coat consists of varnish 50 gallons, butanol 1 gallon, xylol 1 gallon, and aluminum pigment paste 100 pounds.

4. A process of obtaining decorative finishes consisting in applying to a surface of an article, an organic coating containing a repellent substance, said coating being capable of forming a continuous coating on the surface but said coating when dry being capable of repelling other organic coatings, allowing same to dry and applying thereto a second organic coating free from said repellent substance whereby said second coating is repelled by the first coat to produce a discontinuous second coat on said first coat, in which process the first coat consists of varnish 70 gallons, pigment 640 pounds, and 10 gallons of a batch produced by heating 800 pounds oiticica oil to 500° F. with 60 to 80 pounds magnesium carbonate and thinned with 800 pounds xylol.

LEE PRITZKER.

REFERENCES CITED

The following references are of record in the file of this patent:

UNITED STATES PATENTS

| Number | Name | Date |
| --- | --- | --- |
| 916,516 | Williams | Mar. 30, 1909 |
| 1,561,324 | Guenot | Nov. 10, 1925 |
| 1,872,999 | McCarthy | Aug. 23, 1932 |
| 1,934,709 | Hemmer | Nov. 14, 1933 |
| 2,022,587 | Cunningham | Nov. 26, 1935 |
| 2,212,400 | Letteron | Aug. 20, 1940 |
| 2,263,900 | Nollau | Nov. 25, 1941 |